(12) United States Patent
Grancharov et al.

(10) Patent No.: US 12,450,759 B2
(45) Date of Patent: Oct. 21, 2025

(54) IMAGE REGISTRATION BASED ON KEY-POINT MATCHING

(71) Applicant: Telefonaktiebolaget LM Ericsson (publ), Stockholm (SE)

(72) Inventors: Volodya Grancharov, Solna (SE); Manish Sonal, Sollentuna (SE); Alfredo Fanghella, Stockholm (SE); Sigurdur Sverrisson, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 752 days.

(21) Appl. No.: 17/774,161

(22) PCT Filed: Nov. 4, 2019

(86) PCT No.: PCT/EP2019/080028
§ 371 (c)(1),
(2) Date: May 4, 2022

(87) PCT Pub. No.: WO2021/089107
PCT Pub. Date: May 14, 2021

(65) Prior Publication Data
US 2022/0366580 A1    Nov. 17, 2022

(51) Int. Cl.
*G06T 7/33*    (2017.01)
*G06V 10/44*    (2022.01)

(52) U.S. Cl.
CPC .............. *G06T 7/33* (2017.01); *G06V 10/443* (2022.01)

(58) Field of Classification Search
CPC .......... G06T 7/33; G06T 7/337; G06V 10/443
See application file for complete search history.

(56) References Cited

U.S. PATENT DOCUMENTS

| 2010/0092093 A1* | 4/2010 | Akatsuka ............... G06Q 30/00 |
| | | 382/218 |
| 2010/0260392 A1 | 10/2010 | Wiemker et al. |
| 2016/0071238 A1* | 3/2016 | Kimura ..................... G06T 7/33 |
| | | 348/36 |

(Continued)

OTHER PUBLICATIONS

Nebekay Georg ("Consensus-based matching and tracking of keypoints for object tracking") IEEE Winter Conference on Applications on Computer Vision. 2014 (Year: 2014).*

(Continued)

*Primary Examiner* — Molly Wilburn
(74) *Attorney, Agent, or Firm* — Sage Patent Group (57) ABSTRACT

A method performed by an image registration entity includes obtaining a matching between a first set of objects in a first image of a scene and a second set of objects in a second image of the scene, and obtaining a first set of key-points from the first image and a second set of key-points from the second image. Image registration is performed by matching the first set of key-points to the second set of key-points. Those of the first set of key-points that are mapped to objects in the first set of objects and that have matching objects in the second set of objects are restricted to only be matched to those of the second set of key-points that are mapped to any of the matching objects in the second set of objects. The matching between key-points resulting from the image registration is applied when constructing an image representation of the scene.

20 Claims, 4 Drawing Sheets

(56) References Cited

U.S. PATENT DOCUMENTS

2017/0178372 A1 6/2017 Gormish et al.
2018/0308245 A1 10/2018 Yang et al.

OTHER PUBLICATIONS

Ali, Shahzah ("Panoramic Image Construction using Feature based Registration Methods") 15th International Mutitopic Conference. 2012. (Year: 2012).*

International Search Report and Written Opinion of the International Searching Authority, PCT/EP2019/080028, mailed Jun. 8, 2020, 9 pages.

Szeliski, R., "Image Alignment and Stitching: A Tutorial," Technical Report MSR-TR-2004- 92, Dec. 10, 2006, 89 pages.

Torr, P.H.S. et al., "MLESAC: A New Robust Estimator with Application to Estimating Image Geometry." Computer Vision and Image Understanding, vol. 18, Issue 1, 2000, 19 pages.

Schonberger, J. et al., "Structure-from-Motion revisited," in Proceedings of the IEEE Conference on Computer Vision and Pattern Recognition, Las Vegas, 2016, 10 pages.

Mur-Artal, R. et al. "ORB-SLAM: a versatile and accurate monocular SLAM system," IEEE Transactions on Robotics, vol. 31, No. 5, 2015, 17 pages.

* cited by examiner

IMAGE REGISTRATION BASED ON KEY-POINT MATCHING

CROSS REFERENCE TO RELATED APPLICATIONS

This application is a 35 U.S.C. § 371 national stage application of PCT International Application No. PCT/EP2019/080028 filed on Nov. 4, 2019, the disclosure and content of which is incorporated by reference herein in its entirety.

TECHNICAL FIELD

Embodiments presented herein relate to a method, an image registration entity, a computer program, and a computer program product for image registration.

BACKGROUND

Image registration might generally involve transforming different sets of data into one coordinate system. The sets of data might comprise multiple images as captured from different sensors, at different times, depths, or viewpoints. Image registration might be used in application such as computer vision, medical imaging, military automatic target recognition, compiling and analyzing images and data from satellites, super resolution applications, creating a panoramic view of a scene, creating a three-dimensional (3D) model of the scene, etc.

Some aspects of image registration consider the problem of identifying overlapping regions and the geometric transform between pairs of images.

One example of a scheme used for image registration is based on matching key-points across the images. Sets of key-points and their descriptors are extracted from each image. The descriptors can used to establish correspondence between of key-points across pairs of images, and in turn be used to establish the geometric transform.

It might be challenging to create a consistent mapping between the key-points across pairs of images due to there being a large number of key-points and due to there being many key-points with similar descriptors. One solution is to perform a brute force search and reject a large number of incorrect mappings by imposing some geometrical transform and using, e.g., a random sample consensus (RANSAC) algorithm.

Hence, there is still a need for improved mechanisms for image registration, and especially in terms of efficient matching between key-points across pairs of images.

SUMMARY

An object of embodiments herein is to provide mechanisms for efficient image registration not suffering from the above noted issues, or at least where the above noted issues have been reduced or mitigated.

According to a first aspect there is presented a method for image registration. The method is performed by an image registration entity. The method comprises obtaining a matching between a first set of objects in a first image of a scene and a second set of objects in a second image of the scene. The first set of objects and the second set of objects are extracted using visual object detection in the first image and in the second image, respectively. The method comprises obtaining a first set of key-points as extracted from the first image and a second set of key-points as extracted from the second image. The method comprises performing image registration by matching the first set of key-points to the second set of key-points. Those of the first set of key-points that are mapped to objects in the first set of objects and that have matching objects in the second set of objects are restricted to only be matched to those of the second set of key-points that are mapped to any of the matching objects in the second set of objects. The method comprises applying the matching between key-points resulting from the image registration when constructing an image representation of the scene.

According to a second aspect there is presented an image registration entity for image registration. The image registration entity comprises processing circuitry. The processing circuitry is configured to cause the image registration entity to obtain a matching between a first set of objects in a first image of a scene and a second set of objects in a second image of the scene. The first set of objects and the second set of objects are extracted using visual object detection in the first image and in the second image, respectively. The processing circuitry is configured to cause the image registration entity to obtain a first set of key-points as extracted from the first image and a second set of key-points as extracted from the second image. The processing circuitry is configured to cause the image registration entity to perform image registration by matching the first set of key-points to the second set of key-points. Those of the first set of key-points that are mapped to objects in the first set of objects and that have matching objects in the second set of objects are restricted to only be matched to those of the second set of key-points that are mapped to any of the matching objects in the second set of objects. The processing circuitry is configured to cause the image registration entity to apply the matching between key-points resulting from the image registration when constructing an image representation of the scene.

According to a third aspect there is presented an image registration entity for image registration. The image registration entity comprises an obtain module configured to obtain a matching between a first set of objects in a first image of a scene and a second set of objects in a second image of the scene. The first set of objects and the second set of objects are extracted using visual object detection in the first image and in the second image, respectively. The image registration entity comprises an obtain module configured to obtain a first set of key-points as extracted from the first image and a second set of key-points as extracted from the second image. The image registration entity comprises an image registration module configured to perform image registration by matching the first set of key-points to the second set of key-points. Those of the first set of key-points that are mapped to objects in the first set of objects and that have matching objects in the second set of objects are restricted to only be matched to those of the second set of key-points that are mapped to any of the matching objects in the second set of objects. The image registration entity comprises an apply module configured to apply the matching between key-points resulting from the image registration when constructing an image representation of the scene.

According to a fourth aspect there is presented a computer program for image registration, the computer program comprising computer program code which, when run on an image registration entity, causes the image registration entity to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient image registration.

Advantageously, these aspects do not suffer from the above noted issues.

Advantageously, use of the information about matched objects in the images is used to constrain the matching between key-points, which leads to improved accuracy and complexity reduction in the image registration process.

Advantageously, the proposed method and image registration require comparatively low complexity for implementation and execution.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to to those skilled in the art. Like numbers refer to like elements throughout the description. Any step or feature illustrated by dashed lines should be regarded as optional.

The embodiments disclosed herein relate to mechanisms for image registration. In order to obtain such mechanisms there is provided an image registration entity, a method performed by the image registration entity, a computer program product comprising code, for example in the form of a computer program, that when run on an image registration entity, causes the image registration entity to perform the method.

As noted above there is still a need for improved mechanisms for image registration, and especially in terms of efficient matching between key-points across pairs of images.

In this respect, many traditional mechanisms for image registration would perform the matching of key-points and the localization of objects in parallel to understand the environment of the scene since these two tasks typically are regarded as addressing different problems and therefore performed separately.

At least some of the herein disclosed embodiments are based on using the knowledge from having performed object detection when matching key-points between different images to enable more efficient image registration. As will be further disclosed below, this might be realized by splitting the total set of key-points of each image into sub-sets based on their correspondence to the image areas under detected objects.

Figure 1:
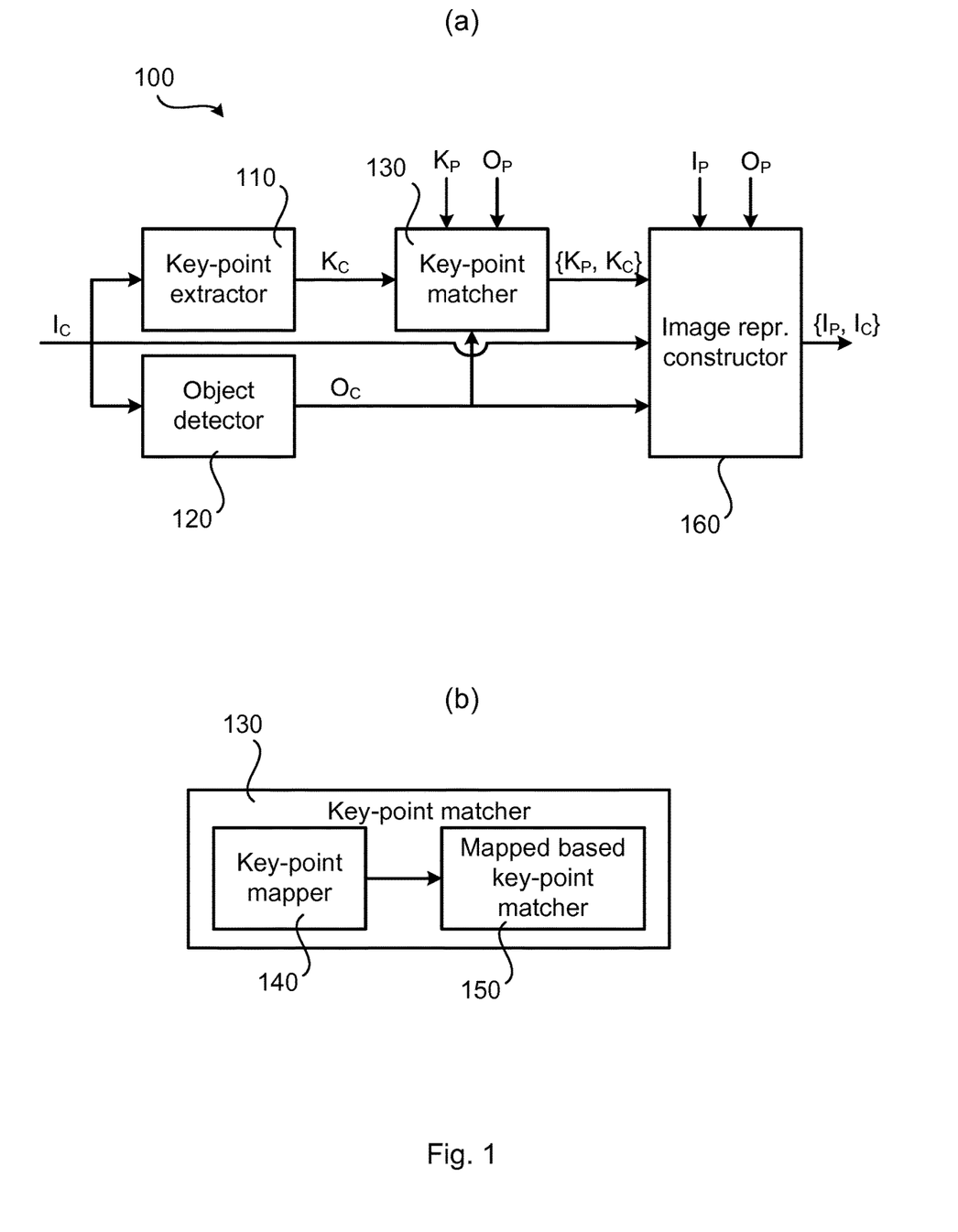
FIG. 1 is a schematic diagram illustrating an image registration arrangement according to embodiments.

FIG. 1($a$) is a schematic diagram illustrating an image registration entity 100 where embodiments presented herein can be applied. Without loss of generality, the image registration entity 100 illustrates how a current image $I_c$ is processed. It is assumed that a previous image $I_p$ has been processed in the same manner. The image registration entity 100 comprises a key-point extractor 110 configured to extract key-points $K_c$ from the current image $I_c$. In some examples the key-points are represented by spatial coordinates X and the corresponding descriptor D, i.e., K=[X, D]. The descriptor of a given key-point could describe statistics, in terms of gradients, texture, etc., in a surrounding of the given key-point. The image registration entity 100 comprises an object detector 120 configured to detect objects $O_c$ from the current image $I_c$. In some examples the objects are represented by a location B (for example given in terms of bounding box coordinates) and an object class C, i.e., O=[B, C]. The image registration entity 100 comprises a key-point matcher 130 configured to match the key-points $K_c$ from the current image $I_c$ to key-points $K_p$ from the previous image $I_p$ using the objects $O_c$ detected the current image $I_c$ and objects $O_p$ detected the previous image $I_p$. The image registration entity 100 comprises an image representation constructor 160 configured to, from the matching key-points $\{K_p, K_c\}$ as found by the key-point matcher 130, the current image $I_p$, the previous image $I_p$, the objects $O_c$ from the current image $I_c$, and the objects $O_p$ from the previous image $I_p$, construct an image representation $\{I_p, I_c\}$ of the current image $I_p$ and the previous image $I_p$.

FIG. 1($b$) in more detail illustrates the key-point matcher 130. The key-point matcher 130 comprises a key-point mapper 140 configured to map key-points to objects (i.e., key-points $K_c$ are mapped to objects $O_c$ in image $I_c$). The key-point matcher 130 comprises a mapped based key-point matcher 150 configured to match key-points $K_c$ to key-points $K_p$ based on which key-points are mapped to which objects, for both images $I_c$ and $I_p$.

Figure 2:
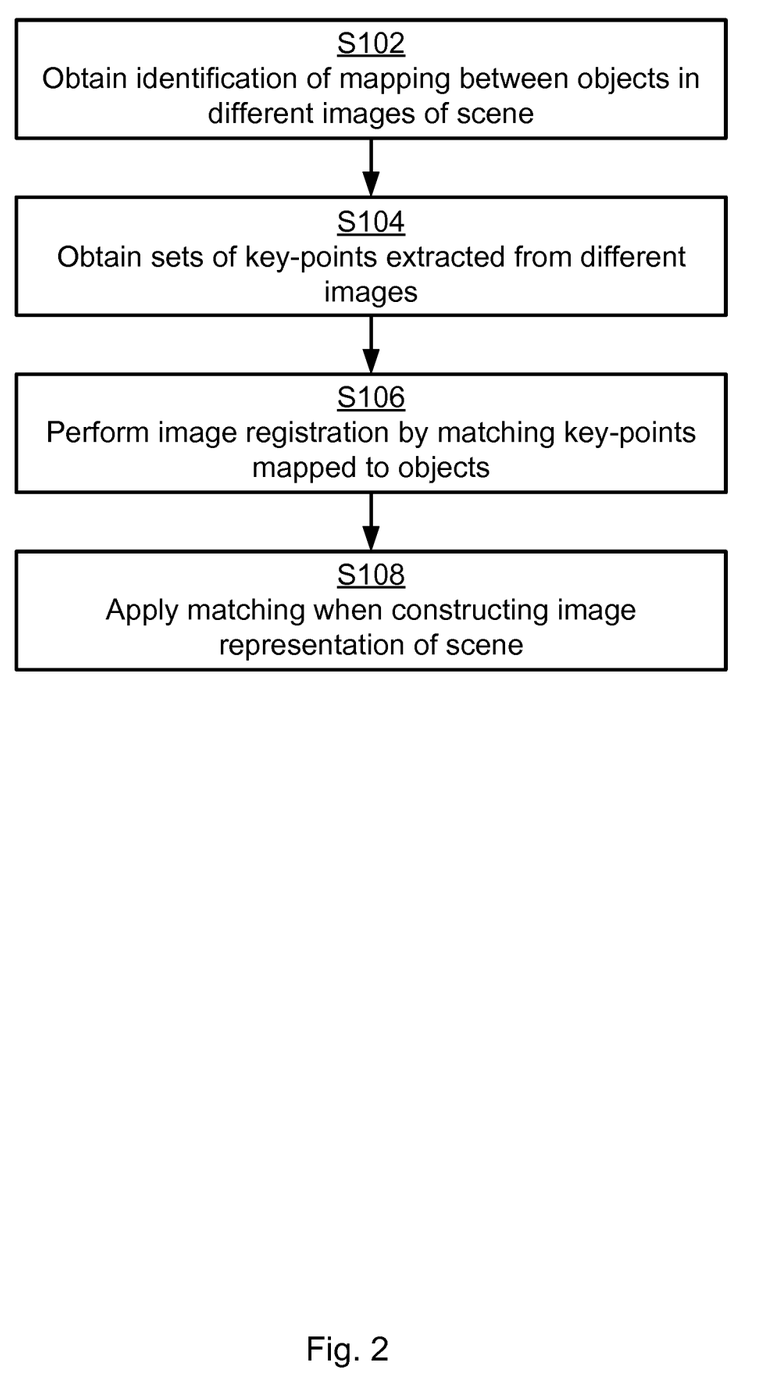
FIG. 2 is a flowchart of methods according to embodiments.

FIG. 2 is a flowchart illustrating embodiments of methods for image registration. The methods are performed by the image registration entity 100. The methods are advantageously provided as computer programs 620.

The image registration is performed for a first image and a second image of the same scene. The first image comprises a first set of objects and the second image comprises a second set of objects. Since both images are of the same scene it is assumed that at least some of the object are part of both images and thus that there is a matching between some of the first set of objects and some of the second set of objects.

Figure 3:
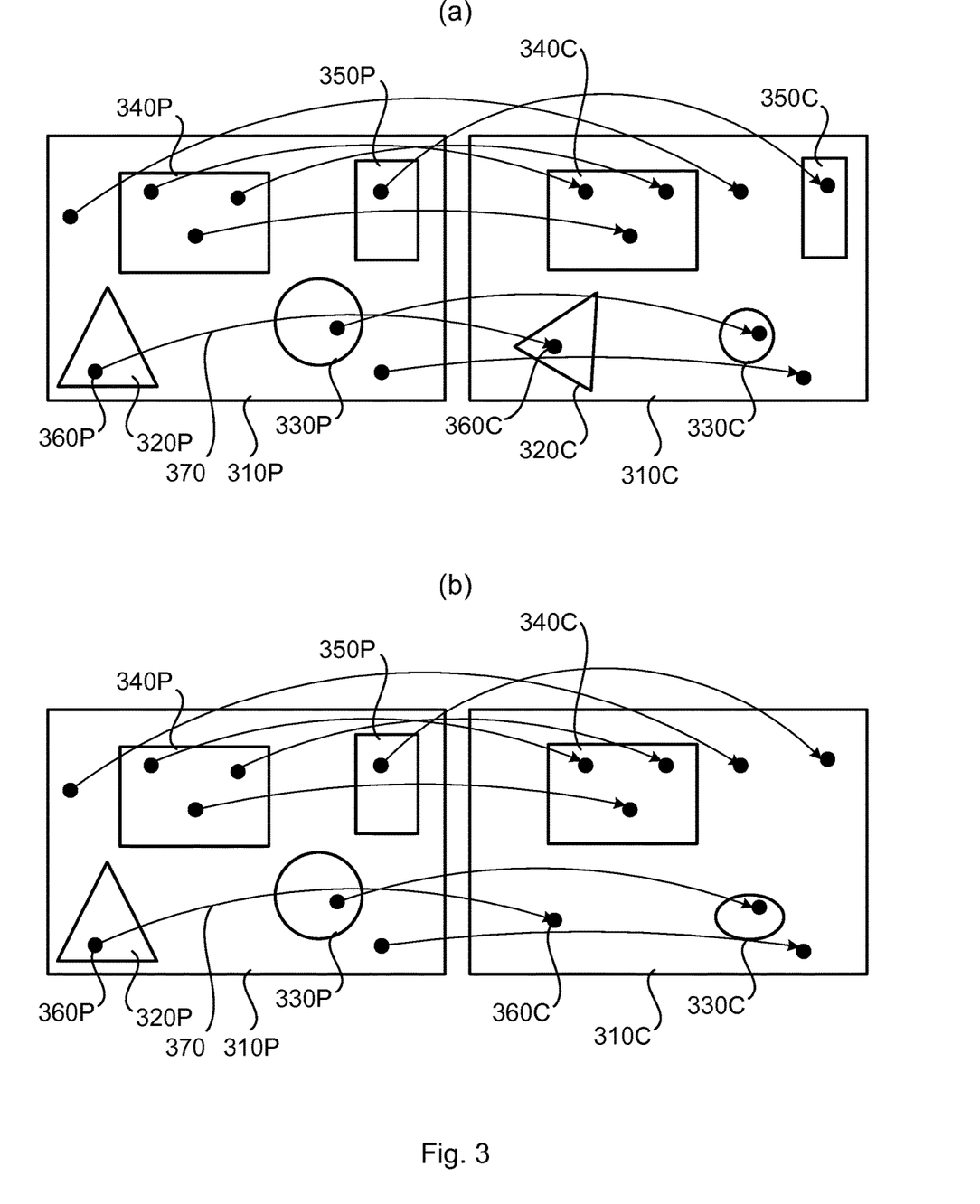
FIG. 3 schematically illustrates matching of key-points between two images according to an embodiment.

S102: The image registration entity 100 obtains a matching between a first set of objects 320P, 330P, 340P, 350P in a first image 310P of a scene and a second set of objects 320C, 330C, 340C, 350C in a second image 310C of the scene. The first set of objects 320P, 330P, 340P, 350P and the second set of objects 320C, 330C, 340C, 350C are extracted using visual object detection in the first image 310P and in the second image 310C, respectively.

Each of the first image and the second image comprises respective sets of key-points.

S104: The image registration entity 100 obtains a first set of key-points as extracted from the first image 310P and a second set of key-points as extracted from the second image 310C.

The key-points of the first image are to be matched to the key-points of the second image. The matching is based on using information of the match between the sets of objects in the different images, as obtained in S102.

S106: The image registration entity 100 performs image registration. Image registration is performed by the image registration entity 100 matching the first set of key-points to the second set of key-points. Those of the first set of key-points that are mapped to objects in the first set of objects 320P, 330P, 340P, 350P and that have matching objects in the second set of objects 320C, 330C, 340C, 350C are restricted to only be matched to those of the second set of key-points that are mapped to any of the matching objects in the second set of objects 320C, 330C, 340C, 350C.

Thus, the first set of key-points and the second set of key-points could each be regarded as being divided in subsets, where each subset of key-points corresponds to an individual object in one of the images. The matching in S106 then is performed individually for each subset in the first image, where the key-points in a subset corresponding to a given object in the first image are matched to the key-points in the subset corresponding to the object in the second image being mapped to the given object in the first image.

Intermediate reference is here made to FIG. 3(*a*). FIG. 3(*a*) schematically illustrates a first image 310P having a first set of objects 320P, 330P, 340P, 350P. FIG. 3(*a*) further schematically illustrates a second image 310C having a second set of objects 320C, 330C, 340C, 350C. FIG. 3(*b*) further schematically illustrates key-points (one of which is identified at reference numeral 360P) in the first image 310P and key-points (one of which is identified at reference numeral 360C) in the second image, and matching (in terms of directed arrows, one of which is identified at reference numeral 370) between the key-points in the first image 310P and the key-points in the second image 310P. It is for illustrative examples assumed that key-point 360P is mapped to to object 320P, that key-point 360C is mapped to object 320C, that object 320P is matched to object 320C, and thus that key-point 36oP is matched to key-point 360C, as indicated by arrow 370.

Information of the matching between the key-points is then used when an image representation of the scene is constructed.

S108: The image registration entity too applies the matching between key-points resulting from the image registration when constructing an image representation of the scene.

Embodiments relating to further details of image registration as performed by the image registration entity too will now be disclosed.

There could be different ways for the first set of objects to be matched to the second set of objects.

In some aspects, the matching is based on object class identifiers, or identities, denoted object class IDs. That is, each object might be associated with an object class ID. Then, in some embodiments, the first set of objects 320P, 330P, 340P, 350P are matched to the second set of objects 320C, 330C, 340C, 350C by object class ID matching.

Further, the matching between the first set of key-points and the second set of key-points might only be made between key-points mapped to objects of same object class ID.

In some aspects, the matching is based on location of the objects in the first image and in the second image, respectively. Therefore, each object in the first set of objects 320P, 330P, 340P, 350P might be associated with a respective location in the first image 310P, and each object in the second set of objects 320C, 330C, 340C, 350C might be associated with a respective location in the second image 310C. Then, in some embodiments, the first set of objects 320P, 330P, 340P, 350P are matched to the second set of objects 320C, 330C, 340C, 350C by location matching.

In general terms, the location matching between an object in the first image and an object in the second image relates to the distance-wise difference between the location of the object in the first image and the location of the object in the second image; the lower the difference the higher the location matching is. There could be different ways to perform the location matching. In some embodiments, the location matching is based on Jaccard index values computed between the objects in the first set of objects 320P, 330P, 340P, 350P and the objects in the second set of objects 320C, 330C, 340C, 350C. The higher the Jaccard index value is between an object in the first image and an object in the second image, the higher the chance is that these two objects are mapped to each other.

In some aspects, the matching is based on descriptors of the key-points. That is, each key-point might have a descriptor, where each descriptor has a value. Then, in some embodiments, the matching between the first set of key-points and the second set of key-points only is made between key-points having as similar descriptor values as possible.

One purpose of the key-point descriptors is to characterize the image area in the vicinity of the key-points. The descriptor D of a key-point is typically provided as a scalar or a finite vector, which summarizes the properties of that key-point. There are different types of available descriptors. As an example, the speeded up robust features (SURF) descriptor is a 64-dimensional vector of floating-point values based on the sum of the Haar wavelet response around the particular key-point. As an example, the scale-invariant feature transform (SIFT) descriptor is a 128-dimensional vector calculated by aggregation histograms of gradient magnitude around the key-point. The histogram of oriented gradients (HOG) descriptor describes local appearance around a key-point by means of concatenated histograms of gradient directions. The Binary Robust Independent Elementary Features (BRIEF) descriptor is a binary version of the SIFT descriptor in the form of a 128-bit number. Beyond capturing the intensity distribution of the pixels within the neighborhood, the descriptors could be based on color gradients, dominant color in the area, etc. As an example, closeness of key-point descriptors could be measured by means of Euclidean vector distance.

There might be different ways to handle cases where key-points are not matched to any object in the first image but to an object in the second image, or matched to an object in the first image but not to any object in the second image, or neither matched to any object in the first image nor to any object in the second image.

In some aspects, the key-points that do not belong to any object in the first image are mapped to key-points belonging to the background (i.e., not to any object) in the second image. In particular, in some embodiments, any of those of the first set of key-points that are not mapped to any object in the first set of objects 320P, 330P, 340P, 350P are restricted to only be matched to those of the second set of key-points that are not mapped to any of the matching objects in the second set of objects 320C, 330C, 340C, 350C.

In some aspects, the key-points that belong to objects in the first image not having any matching objects in the second image are mapped to key-points belonging to the background (i.e., not to any object) in the second image. In particular, some embodiments, any of those of the first set of key-points that are mapped to objects in the first set of objects 320P, 330P, 340P, 350P that do not have any matching objects in the second set of objects 320C, 330C, 340C, 350C are restricted to only be matched to those of the second set of key-points that are not mapped to any of the matching objects in the second set of objects 320C, 330C, 340C, 350C.

If some objects are not detected in a portion of an image, or if the portion of the image does not comprise any object, key-points in that portion of the image will be considered as belonging to the background. This is because the matching is based on correspondence between objects in the first image and in the second image. If an object abruptly disappears from the scene, or it is not detected in one of the images, key-points are considered as belonging to the background. Intermediate reference is here made to FIG. 3(b). FIG. 3(b) schematically illustrates the same first image 310P and the same second image 310C as in FIG. 3(a) but with the difference that object 320C is no longer found in image 310C. Object 320P therefore does not have any matching object in image 310C, and key-point 360P of object 320P in image 310P is therefore matched to the background in image 310C.

There are different ways to map key-points to objects. In some aspects, this mapping is based on the use of bounding boxes. For example, each object might be associated with a bounding box. Then, in some embodiments, each of the key-points is mapped to its object by being located within the bounding box of its object.

There could be different ways to handle situations where there is a match between one object in the first image and two objects in the second image. When an object in the first set of objects 320P, 330P, 340P, 350P is matched to two or more objects in the second set of objects 320C, 330C, 340C, 350C, each of the key-points mapped to that object in the first set of objects 320P, 330P, 340P, 350P is matched to a key-point mapped to either of these two or more objects in the second set of objects 320C, 330C, 340C, 350C. Additional conditions, such as descriptors, could then be applied to determine the matching.

There are different applications where the image representation of the scene could be used. In some examples, the image representation of the scene is a panoramic view comprising, or represented by, the first image 310P and the second image 310C. In some examples, the image representation of the scene is a 3D model comprising, or represented by, the first image 310P and the second image 310C. In further examples, image representation of the scene could be used in medical imaging (where multiple images of human organs or tumours have to be stitched, or in image super resolution applications, where a higher resolution two-dimensional (2D) scene from a set of low resolution 2D images is constructed.

In view of at least some of the above disclosed embodiments, a method for image registration as performed by the image registration entity 100 comprises the following.

Objects are matched, as in S102, between the images $I_P$ and $I_C$ for example using the class ID (type of the object), i.e., match $C_C$ and $C_P$. If there are multiple objects of the same class, the Jaccard index based on $B_C$ and $B_P$ might be used to determine the matching.

The key-points and the corresponding descriptors, $K_C=[X_C, D_C]$, for image Ic are extracted and key-points and the corresponding descriptors, $K_P=[X_P, D_P]$, for image $I_P$ are retrieved, as in S104. The location and type (class) of the objects $O_C=[B_C, C_C]$ for image $I_C$ might be extracted.

Key-points are, as in S106, matched between objects in image $I_P$ and in image $I_C$. Descriptor based key-point association is performed only for the subset of key-points laying in a pair of objects having been matched. Key-points that do not belong to any object might be matched to corresponding background points. The thus matched pairs of key-points might be tested against a geometric transform.

It should be noted that, for the sake of notation but without loss of generality, the notation previous image $I_P$ and current image $I_C$ has been used, thus indicating that these images have been captured at different points in time, such as in a sequence of images. However, the herein disclosed embodiments are also applicable to images produced at the same time instant, but from different sources, e.g., from two different cameras. Further, the herein disclosed embodiments are also applicable beyond usage of single camera; stereo cameras, or additional sensors, could be also used, which includes depth cameras, thermal cameras, or equipment for active scanning, such as laser or lidar.

Figure 4:
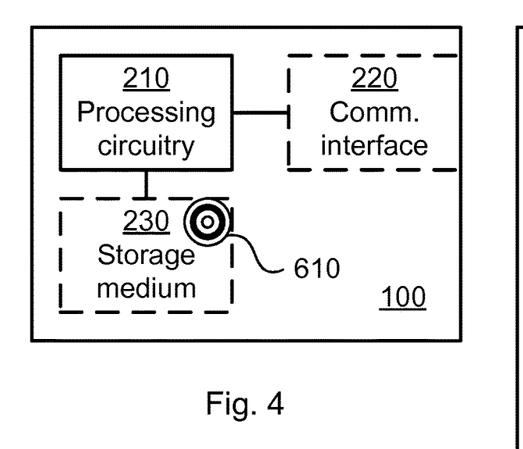
FIG. 4 is a schematic diagram showing functional units of an image registration entity according to an embodiment.

FIG. 4 schematically illustrates, in terms of a number of functional units, the components of an image registration entity 100 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 610 (as in FIG. 6), e.g. in the form of a storage medium 230. The processing circuitry 210 may further be provided as at least one application specific integrated circuit (ASIC), or field programmable gate array (FPGA).

Particularly, the processing circuitry 210 is configured to cause the image registration entity 100 to perform a set of operations, or steps, as disclosed above. For example, the storage medium 230 may store the set of operations, and the processing circuitry 210 may be configured to retrieve the set of operations from the storage medium 230 to cause the image registration entity 100 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The image registration entity 100 may further comprise a communications interface 220 at least configured for communications with other entities, nodes, functions, and devices. As such the communications interface 220 may comprise one or more transmitters and receivers, comprising analogue and digital components. The processing circuitry 210 controls the general operation of the image registration entity 100 e.g. by sending data and control signals to the communications interface 220 and the storage medium 230, by receiving data and reports from the communications interface 220, and by retrieving data and instructions from the storage medium 230. Other components, as well as the related functionality, of the image registration entity 100 are omitted in order not to obscure the concepts presented herein.

Figure 5:
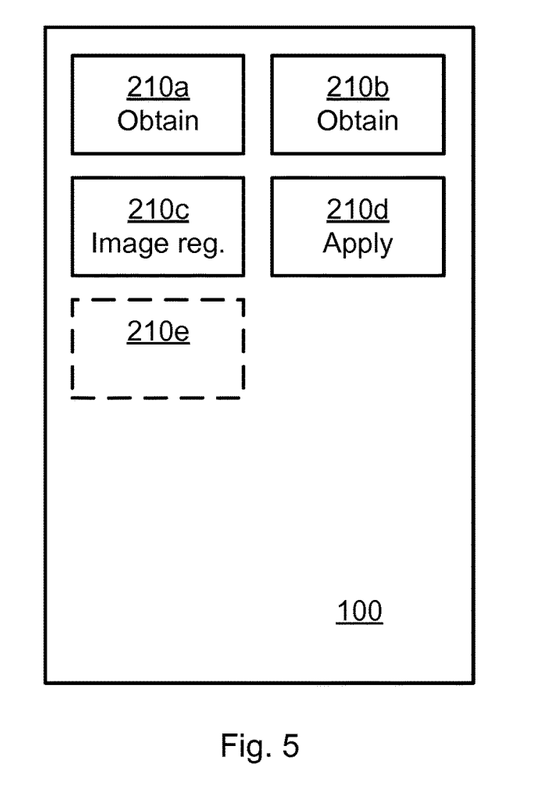
FIG. 5 is a schematic diagram showing functional modules of an image registration entity according to an embodiment.

FIG. 5 schematically illustrates, in terms of a number of functional modules, the components of an image registration entity 100 according to an embodiment. The image registration entity 100 of FIG. 5 comprises a number of functional modules; an obtain module 210a configured to perform step S102, an obtain module 210b configured to perform step S104, an image registration module 210c configured to perform step S106, and an apply module 210d configured to perform step S108. The image registration entity 100 of FIG. 5 may further comprise a number of optional functional modules, as represented by functional module 210e. In general terms, each functional module 210a-210e may in one embodiment be implemented only in hardware and in another embodiment with the help of software, i.e., the latter embodiment having computer program instructions stored on the storage medium 230 which when run on the processing circuitry makes the image registration entity 100 perform the corresponding steps mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

The image registration entity 100 might be integrated with, be part of, or collocated with, an image processing device, such as a graphics processing unit (GPU), a visual processing unit (VPU) or a tensor processing unit (TPU), and/or be provided in any of: a video card, a mother board, an embedded system, a mobile phone, a vehicle, a personal computer, a workstation, or a game console.

A first portion of the instructions performed by the image registration entity 100 may be executed in a first device, and a second portion of the of the instructions performed by the image registration entity 100 may be executed in a second device; the herein disclosed embodiments are not limited to any particular number of devices on which the instructions performed by the image registration entity 100 may be executed. Hence, the methods according to the herein disclosed embodiments are suitable to be performed by an image registration entity 100 residing in a cloud computational environment. Therefore, although a single processing circuitry 210 is illustrated in FIG. 4 the processing circuitry 210 may be distributed among a plurality of devices, or nodes. The same applies to the functional modules 210a-210e of FIG. 5 and the computer program 620 of FIG. 6.

Figure 6:
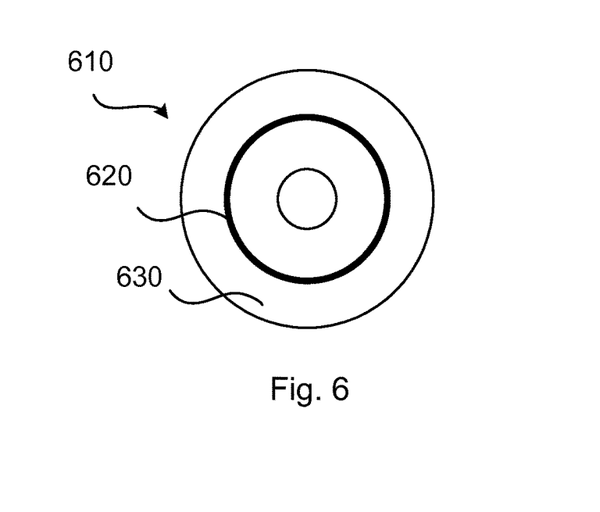
FIG. 6 shows one example of a computer program product comprising computer readable storage medium according to an embodiment.

FIG. 6 shows one example of a computer program product 610 comprising computer readable storage medium 630. On this computer readable storage medium 630, a computer program 620 can be stored, which computer program 620 can cause the processing circuitry 210 and thereto operatively coupled entities and devices, such as the communications interface 220 and the storage medium 230, to execute methods according to embodiments described herein. The computer program 620 and/or computer program product 610 may thus provide means for performing any steps as herein disclosed.

In the example of FIG. 6, the computer program product 610 is illustrated as an optical disc, such as a CD (compact disc) or a DVD (digital versatile disc) or a Blu-Ray disc. The computer program product 610 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 620 can be stored in any way which is suitable for the computer program product 610.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for image registration, the method being performed by an image registration entity, the method comprising:
   obtaining a matching between a first set of objects in a first image of a scene and a second set of objects in a second image of the scene, the first set of objects and the second set of objects being extracted using visual object detection in the first image and in the second image, respectively;
   obtaining a first set of key-points as extracted from the first image and a second set of key-points as extracted from the second image;
   performing image registration by matching the first set of key-points to the second set of key-points, wherein those of the first set of key-points that are mapped to objects in the first set of objects and that have matching objects in the second set of objects are restricted to only be matched to those of the second set of key-points that are mapped to any of the matching objects in the second set of objects; and
   applying the matching between key-points resulting from the image registration when constructing an image representation of the scene,
   wherein any of those of the first set of key-points that are not mapped to any object in the first set of objects are restricted to only be matched to those of the second set of key-points that are not mapped to any of the matching objects in the second set of objects.

2. The method according to claim 1, wherein each object is associated with an object class ID, and wherein the first set of objects are matched to the second set of objects by object class ID matching, and wherein matching between the first set of key-points and the second set of key-points only is made between key-points mapped to objects of same object class ID.

3. The method according to claim 1, wherein each object in the first set of objects is associated with a respective location in the first image, wherein each object in the second set of objects is associated with a respective location in the second image, and wherein the first set of objects are matched to the second set of objects by location matching.

4. The method according to claim 3, wherein the location matching is based on Jaccard index values computed between the objects in the first set of objects and the objects in the second set of objects.

5. The method according to claim 1, wherein each key-point has a descriptor, each descriptor having a descriptor value, and wherein matching between the first set of key-points and the second set of key-points only is made between key-points having as similar descriptor values as possible.

6. The method according to claim 1, wherein any of those of the first set of key-points that are mapped to objects in the first set of objects that do not have any matching objects in the second set of objects are restricted to only be matched to those of the second set of key-points that are not mapped to any of the matching objects in the second set of objects.

7. The method according to claim 1, wherein when an object in the first set of objects is matched to two or more objects in the second set of objects (, each of the key-points mapped to that object in the first set of objects is matched to a key-point mapped to either of said two or more objects in the second set of objects.

8. An image registration entity for image registration, the image registration entity comprising processing circuitry, the processing circuitry being configured to cause the image registration entity to:
    obtain a matching between a first set of objects in a first image of a scene and a second set of objects in a second image of the scene, the first set of objects and the second set of objects being extracted using visual object detection in the first image (310P) and in the second image, respectively;
    obtain a first set of key-points as extracted from the first image and a second set of key-points as extracted from the second image;
    perform image registration by matching the first set of key-points to the second set of key-points, wherein those of the first set of key-points that are mapped to objects in the first set of objects and that have matching objects in the second set of objects are restricted to only be matched to those of the second set of key-points that are mapped to any of the matching objects in the second set of objects; and
    apply the matching between key-points resulting from the image registration when constructing an image representation of the scene,
    wherein any of those of the first set of key-points that are not mapped to any object in the first set of objects are restricted to only be matched to those of the second set of key-points that are not mapped to any of the matching objects in the second set of objects.

9. The image registration entity according to claim 8, wherein each object is associated with an object class ID, and wherein the first set of objects are matched to the second set of objects by object class ID matching.

10. The image registration entity according to claim 9, wherein matching between the first set of key-points and the second set of key-points only is made between key-points mapped to objects of same object class ID.

11. The image registration entity according to claim 8, wherein each object in the first set of objects is associated with a respective location in the first image, wherein each object in the second set of objects is associated with a respective location in the second image, and wherein the first set of objects are matched to the second set of objects by location matching.

12. The image registration entity according to claim 11, wherein the location matching is based on Jaccard index values computed between the objects in the first set of objects and the objects in the second set of objects.

13. The image registration entity according to claim 8, wherein each key-point has a descriptor, each descriptor having a descriptor value, and wherein matching between the first set of key-points and the second set of key-points only is made between key-points having as similar descriptor values as possible.

14. The image registration entity according to claim 8, wherein any of those of the first set of key-points that are mapped to objects in the first set of objects that do not have any matching objects in the second set of objects are restricted to only be matched to those of the second set of key-points that are not mapped to any of the matching objects in the second set of objects.

15. The image registration entity according to claim 8, wherein each object is associated with a bounding box, and wherein each of the key-points is mapped to its object by being located within the bounding box of its object.

16. The image registration entity according to claim 8, wherein when an object in the first set of objects is matched to two or more objects in the second set of objects, each of the key-points mapped to that object in the first set of objects is matched to a key-point mapped to either of said two or more objects in the second set of objects.

17. The image registration entity according to claim 8, wherein the image representation of the scene is a panoramic view comprising, or represented by, the first image and the second image.

18. The image registration entity according to claim 8, wherein the image representation of the scene is a 3D model comprising, or represented by, the first image and the second image.

19. A non-transitory computer readable medium having instructions stored therein that are executable by processing circuitry of an image registration entity to cause the image registration entity to perform operations for image registration, the operations comprising:
    obtaining a matching between a first set of objects in a first image of a scene and a second set of objects in a second image of the scene, the first set of objects and the second set of objects being extracted using visual object detection in the first image and in the second image, respectively;
    obtaining a first set of key-points as extracted from the first image and a second set of key-points as extracted from the second image;
    performing image registration by matching the first set of key-points to the second set of key-points, wherein those of the first set of key-points that are mapped to objects in the first set of objects and that have matching objects in the second set of objects are restricted to only be matched to those of the second set of key-points that are mapped to any of the matching objects in the second set of objects; and
    applying the matching between key-points resulting from the image registration when constructing an image representation of the scene,
    wherein any of those of the first set of key-points that are not mapped to any object in the first set of objects are restricted to only be matched to those of the second set of key-points that are not mapped to any of the matching objects in the second set of objects.

20. The non-transitory computer readable medium of claim 19, wherein each object in the first set of objects is associated with a respective location in the first image, wherein each object in the second set of objects is associated with a respective location in the second image, and wherein the first set of objects are matched to the second set of objects by location matching, and wherein the location matching is based on Jaccard index values computed between the objects in the first set of objects and the objects in the second set of objects.

* * * * *